United States Patent [19]

Schipper et al.

[11] Patent Number: 5,568,119

[45] Date of Patent: Oct. 22, 1996

[54] ARRESTEE MONITORING WITH VARIABLE SITE BOUNDARIES

[75] Inventors: John F. Schipper, Palo Alto; James M. Janky, Los Altos, both of Calif.

[73] Assignee: Trimble Navigation Limited, Sunnyvale, Calif.

[21] Appl. No.: 171,228

[22] Filed: Dec. 21, 1993

[51] Int. Cl.$^6$ .............................. G08B 23/00; G01J 3/48
[52] U.S. Cl. .................... 340/825.370; 340/573; 340/539; 340/572; 340/825.54; 379/38
[58] Field of Search ................ 340/825.44, 573, 340/825.08, 825.49, 825.34, 825.72, 825.37, 572, 539; 342/463, 450; 256/10; 379/38

[56] References Cited

U.S. PATENT DOCUMENTS

| | | | |
|---|---|---|---|
| 4,596,988 | 6/1986 | Wanka | 343/457 |
| 4,651,157 | 3/1987 | Gray et al. | 342/457 |
| 4,894,662 | 1/1990 | Counselman | 342/357 |
| 4,918,425 | 4/1990 | Greenberg et al. | 340/539 |
| 4,918,432 | 4/1990 | Pauley et al. | 340/825.08 |
| 5,045,861 | 9/1991 | Duffet-Smith | 342/457 |
| 5,051,741 | 9/1991 | Wesby | 340/825.49 |
| 5,153,584 | 10/1992 | Engira | 340/870.18 |
| 5,173,710 | 12/1992 | Kelley et al. | 342/463 |
| 5,434,984 | 7/1995 | Deloddere et al. | 395/325 |

OTHER PUBLICATIONS

Meyer, J. A., "Crime Deterrent Transponder System." IEEE Transactions on Aerospace and Electronic Systems, vol. AES-7, No. 1, Jan. 1971, pp. 2–22.

Primary Examiner—Michael Horabik
Assistant Examiner—William H. Wilson, Jr.
Attorney, Agent, or Firm—John Schipper

[57] ABSTRACT

Method and apparatus for monitoring present location of a site arrestee confined to a permitted site of arbitrary size. Present location of the arrestee can be checked at selected time intervals of several hundred milliseconds to thousands of seconds, as desired. The arrestee wears a location-determining ("LD") unit that receives electromagnetic signals that contain information allowing determination of the present location of the LD unit and arrestee, from three or more non-collinear signal sources. These sources may be radiowave subcarrier transmitters, or may be a combination of radiowave subcarrier transmitters and (1) transmitters for a Loran, Omega, Decca, Tacan, JTIDS Relnav or PLRS or similar ground-based system, or (2) transmitters for a satellite-based positioning system, such as GPS or GLONASS. Present location or change in present location of the LD unit is determined and compared with the permitted site boundary at selected times to determine if the arrestee is present at the site. The LD unit issues an alarm signal if the arrestee is not on the presently defined site. The permitted site can be redefined, for a selected time interval, to include the first designated site, a second designated site and a corridor extending between the first and second designated sites. This allows the arrestee to temporarily leave the original designated site to seek service for medical or other needs, or to be transferred to another site. The arrestee can be excluded from one or more designated exclusion sites.

6 Claims, 8 Drawing Sheets

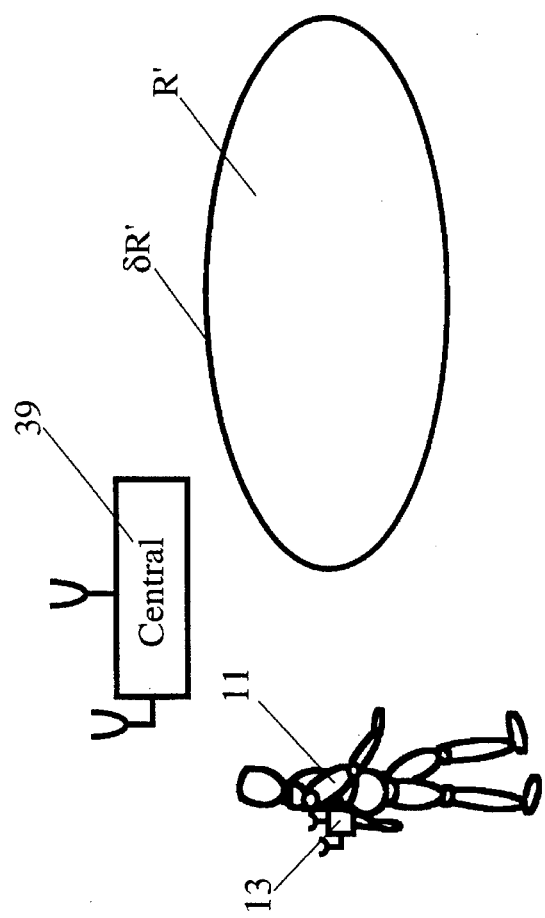
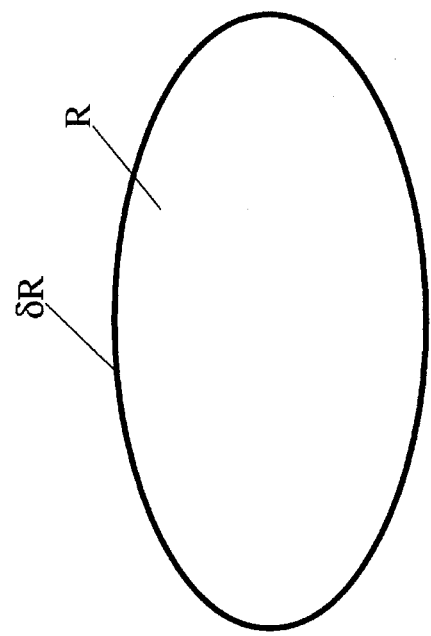
FIG. 10

ARRESTEE MONITORING WITH VARIABLE SITE BOUNDARIES

FIELD OF THE INVENTION

This invention relates to monitoring the location of site arrestees or confinees in an arbitrarily defined area, using radiowave communications.

BACKGROUND OF THE INVENTION

The annual growth of the population of prisoners within the state and federal prisons in the United States has averaged a few percent per year for the last ten years. The total number of such prisoners exceeds 2 million. All felons convicted and sentenced for a crime are placed in one or another of these prisons, with little regard for the severity of the crime, whether the crime involved actual or threatened violence, or whether the crime was primarily directed against property. This approach has several disagreeable consequences. First, the federal and state governments cannot build prisons fast enough to accommodate the growing prison population, and some courts are treating prison overcrowding as a violation of the prisoners' constitutional rights. Second, the amount of money spent on new prisons, estimated to be $80,000–100,000 per cell, is now a substantial part of the annual budget of state and federal governments. Third, prisons must be built in relatively large sizes to obtain economies of scale so that siting of such prisons is often a problem. Fourth, the average cost of providing room, board, recreation and security for a prisoner is now estimated to be about $8,000–12,000 per year, and this cost increases with inflation. Fifth, prisoners convicted of non-violent crimes are usually thrown together with, and are often preyed upon by, prisoners convicted of violent crimes. Sixth, prisoners who might still work and make a positive contribution to society are discouraged or prevented from doing so because of a lack of facilities needed for such activities.

Some workers have conceived other ways of handling some of these problems by providing portable jail or prison cells or by providing monitoring tags that must be worn by the prisoners. One early device, disclosed in U.S. Pat. No. 3,478,344, issued to Schwitzgebel et al, provides an omnidirectional transceiver carried on the waist and an encoded oscillator, uniquely identifying the wearer, that communicates with the transceiver. An inmate or other supervised person in a mental institution or a prison wears this apparatus, which receives signals transmitted from a nearby central station that interrogates the wearer's unit concerning the location of the unit. The unit responds automatically. The method used for determination of location of the wearer's unit might be triangulation, which would require provision of at least three additional stations. Miller, in U.S. Pat. No. 4,495,496, discloses a similar approach for locating miners working a in different shafts in a mine.

Schlatter et al, in U.S. Pat. No. 3,722,152, disclose a portable jail cell that can be transported as a disassembled unit and then assembled and used within a jail or other designated security area. The cell walls and floor are made of metal and concrete, and two or more such portable cells can be placed side-by-side to conserve space. A portable cell must be placed within a jail or other secured facility to provide overall security.

In U.S. Pat. No. 4,571,904, Kessler et al disclose a patient enclosure, to be placed within and form part of a hospital room, that operates similarly to the portable cell of Schlatter et al. The patient enclosure is a separate room-within-a-room that is cleared of all furniture except the patient's bed, may include padding on the walls, and is intended to be used for patients with brain damage who must be protected from further injury by their own actions.

A personnel monitoring system that uses the telephone for communication between the person whose location is monitored and a central station is disclosed in U.S. Pat. No. 4,747,120, issued to Foley. The monitored person wears a bracelet and is occasionally required to take some action, such as insertion of the bracelet into a decoder that transmits a coded verification signal to the central station over a dedicated phone line that is enabled only when used. The system is provided with some means that does not allow transmission of false signals to the central station.

Watson, in U.S. Pat. No. 4,777,477, discloses a location surveillance system for a designated person, such as a parolee, that detects departure of that person from a designated site, such as an enclosed building. The person wears a sensor-transmitter, a wrist band and a current-carrying loop wrapped around the body. The sensor senses when the person leaves the building and causes the transmitter to broadcast an alarm that is received by a receiver located within the building. The system senses an attempt to remove the loop from the body, using strain gauge apparatus, and transmits another alarm signal.

A house arrest monitoring system, using an identification tag that is worn near the flesh of the prisoner under house arrest, is disclosed in U.S. Pat. 4,918,432, issued to Pauley et al. A tag worn by a prisoner transmits a signal having a unique code portion that identifies that prisoner so that several prisoners can be sequestered at one site. A field monitoring device (FMD), connected to a telephone line, receives and analyzes these transmitted signals and determines if (1) the prisoner is present at the site and (2) the tag is being continuously worn near the flesh of the wearer. If one or the other of these conditions is not true, the FMD communicates this information to a central processing unit (CPU), using the telephone line, and personnel at this CPU respond accordingly. The intensity of the signal transmitted by the tag may be improved using a signal repeater to communicate with the FMD. One CPU is used to monitor the locations of prisoners at one or several house arrest sites. The presence of a prisoner at the site is determined primarily by receipt of a tag signal having that prisoner's code included. A prisoner, wearing a tag, could move away from the site a considerable distance before the FMD would sense this, because the location of a tag cannot be determined with much accuracy.

U.S. Pat. No. 4,952,928, issued to Carroll et al, discloses a presence monitoring and identification system, including a body condition sensor and transponder to be worn by the monitored person. In response to receipt of a radiowave request, the transponder transmits a signal to a field monitoring device (FMD), identifying the wearer and including information sensed by the body sensor, such as heart rate, skin perspiration, muscle movement, etc. The FMD is located near where the monitored person should be and periodically transmits to a central station body information on, and the location of, the monitored person. The system is intended to monitor the condition and location of a person under house arrest.

Williamson et al, in U.S. Pat. No. 4,999,613, disclose a remote confinement system in which a sequence of different, unsupervised tests are conducted on prisoners confined at a site. The tests are intended to determine the identity of a prisoner, whether a given person is present or absent at the site, and certain characteristics of the conduct of a prisoner at the site (e.g., a prisoner's sobriety). A radio transmitter, worn on the leg of each prisoner, transmits signals containing these data, which is received by an adjacent home monitoring unit, then relayed over a telephone line to a central station where these data are collected and analyzed. The present location of a prisoner cannot be accurately determined, for reasons similar to those that characterize the Pauley et al invention discussed above. U.S. Pat. No. 4,843,377, issued to Fuller et al, discloses a system that is similar to the Williamson et al patent, using breath alcohol testing and body fluid testing and verification of the prisoner identity by voice print, graphic image matching or other means.

U.S. Pat. No. 5,052,048, issued to Heinrich for a crime deterrent system, discloses passive pursuit of a suspected perpetrator of a recent crime. Each of a plurality of citizens is provided with a short range FM or AM radio transmitter, tuned to a selected frequency for communication with a central control station. These citizens are alerted to the presence of the suspected perpetrator by a broadcast from the central station. Each such citizen that sights the suspected perpetrator transmits a report to the central station, indicating the suspected perpetrator's present location and direction of movement. The central station maps the movement of the suspected perpetrator and moves to apprehend that person.

A personnel monitoring tag with tamper detection for a person under house arrest is disclosed by Bower et al in U.S. Pat. No. 5,075,670. The tag contains a small radio transmitter that intermittently broadcasts a relatively weak signal that is received by a receiver located on the assigned site. If the arrestee leaves the site, the broadcast signal will become weaker and eventually will not be received by the receiver, in which event an alarm can be given. The tag is provided with a tamper detection circuit. The tag broadcasts a normal signal when the tag has not been tampered with and broadcasts a distinguishable tamper signal when tampering is detected. This apparatus has many interesting features, but it cannot accurately determine the location of an arrestee or detect whether the arrestee stays within a boundary defining the designated site.

A tamper indicator system including a conductive strap that is placed around a limb of a house arrestee is disclosed in U.S. Pat. No. 5,117,222, issued to McCurdy et al. When the strap is put into place, electricity is conducted through a circuit and causes a pulse counter to decrement to a selected minimum number, such as zero, over an initial strap placement period. If tampering or attempted strap removal occurs during this initial strap placement period, a transmitter notifies a monitoring person of this event.

Moore et al, in U.S. Pat. No. 5,121,096, disclose a person locator system that includes an appliance to be worn by a child or by a person with impaired senses. The appliance carries its own power supply and transmits a visual signal and an audible signal (70 dB at 2500 Hz) at selected times, such as every five seconds. The audible signal can, allegedly, be heard at 300 feet. However, this only locates the person wearing the appliance within a circle of area about 283,000 square feet, and the area covered is limited by long-term tolerance for high intensity sounds (about 85 dB). Further, this requires that a another person continuously monitor the varying level of the audible sound periodically emitted by the appliance.

Henry et al, disclose an electronic house arrest system that uses optical links and infrared communications, in U.S. Pat. No. 5,146,207. A prisoner wears apparatus that serves as transmitter and as receiver, using two concealed apertures in the apparatus. This apparatus communicates with a field monitoring device (FMD) that, in turn, communicates with a central station that receives and analyzes the data collected by the FMD. Data collected and the means of communication (telephone or modem) are similar to those disclosed in the Pauley et al patent.

In U.S. Pat. No. 5,170,426, D'Alessio et al disclose a home incarceration system that incorporates voice analysis and verification over a telephone line. The voice of a prisoner who is added to this home arrest system is initially tested to establish a voice template that subsequently can be used to verify voice communication over a phone line by that prisoner. The prisoner communicates with a central office at irregular times by phone calls, and central office apparatus verifies the location and identity of the call responder (prisoner), using the voice template and other characteristics. The location of the prisoner during the time intervals between these phone calls is not determined with this system.

An electronic house arrest system disclosed by Mitchell in U.S. Pat. No. 5,189,395 allows silent calls for assistance from a monitoring officer who makes personal and/or telephone-assisted checks of the presence and identity of prisoners at designated sites. In other respects, this system is similar to the system disclosed in the Pauley et al patent.

A telephone-based home incarceration system in which the prisoner wears a bracelet or other appliance is disclosed by Goudreau et al in U.S. Pat. No. 5,206,897. The bracelet contains an electrical circuit that has specified electrical characteristics that are monitored by an adjacent comparator circuit. If the sets of electrical characteristics do not match, indicating that the prisoner may be absent from the site of incarceration, a central station is notified by phone and appropriate action is taken. Verification of the presence and identity of the prisoner must be requested by placing a telephone call to the prisoner, who then places the bracelet in a special fixture to implement comparison of the electrical characteristics. This verification procedure probably could not be done more often than about once per hour, if the central office has many prisoners to monitor using this system.

Melton et al disclose use of a cellular interface unit for an electronic house arrest system, in U.S. Pat. No. 5,255,306. A field monitoring device (FMD) is positioned at the house arrest site and receives low power, uniquely tagged signals transmitted by a tamper-proof house arrest appliance worn by the arrestee. The FMD monitors the strength of the signals received from the appliance. When the signal strength falls below a selected threshold, the monitoring system determines that the arrestee has moved off the site, and a cellular phone network is used to alert the proper authorities at a central station. The FMD signal threshold is typically set corresponding to a separation distance of 150 feet and cannot distinguish from which direction the signals arrive.

FM subcarrier signals and AM carrier signals have been used for some types of radiowave communications. In U.S. Pat. No. 3,889,264, Fletcher discloses a vehicle location system in which the unsynchronized AM carrier signals from three or more AM radio stations form hyperbolic isophase grid lines that are used to determine location of a vehicle. The vehicle must be equipped with a three-channel, tunable receiver, and its location must be referenced to an initial known location by counting the number of isophase lines crossed after the vehicle leaves the initial location. Isophase drift is compensated for by subtraction frown the count.

Dalabakis et al, in U.S. Pat. No. 4,054,880, disclose a radio navigation and vehicle location system employing three low frequency subcarrier signals received from three radio stations at a three-channel, tunable receiver located on the vehicle. Isophase lines crossed are counted after the vehicle leaves an initial known location. This system, like the Fletcher system, is a delta-position system that determines vehicle location only relative to an initially known location.

U.S. Pat. No. 4,646,290, issued to Hills, discloses use of F.C.C.-approved Subsidiary Communication Authorization (SCA) FM subcarrier signals for one way transmission. This patent discloses transmission of a plurality of messages, which may be delivered to the transmitter at a wide range of bit rates, to be transmitted at a single bit rate that is at least as large as the highest bit rate for message delivery. This method allows for downstream insertion of additional data.

An integrated radio location and communication system for a mobile station is disclosed by Martinez in U.S. Pat. No, 4,651,156. Each mobile station carries a transceiver that issues radio signals that are received by two or more signal transceiver reference sites having fixed, known locations. The transceivers at the mobile station and the reference stations are continuously phase locked to the RF carrier signal from a nearby commercial radio station. The radio station and the mobile station each transmit a brief, distinguishable range tone at a known sequence of times, and the range tone from each station is received by each reference station. From an analysis of the differences in arrival times of the range tones received from the radio station and from the mobile station, the reference stations determine the two-dimensional location of the mobile station. The mobile station uses the beat signal between two RF subcarrier frequencies to generate its range tone signal and to distinguish that mobile station transmissions from the transmissions of any other mobile station.

Young et al, in U.S. Pat. No. 4,660,193, discloses use of two SCA FM subcarrier signals, the first being amplitude modulated and the second being phase modulated, to provide a digital data transmission system. A subcarrier signal within this system may also be modulated to carry audio signals.

A multichannel FM subcarrier broadcast system that provides a sequence of relatively closely spaced channels, using independent sidebands of suppressed carriers, is disclosed by Karr et al in U.S. Pat. No. 4,782,531. The sideband signals are generated in pairs and are phase shifted before transmission. Upon receipt of the transmitted signals, the process is reversed. An earlier patent, U.S. Pat. No. 3,518,376, issued to Caymen and Walker, discloses a similar approach without use of signal phase shifting of pairs of sideband signals.

In U.S. Pat. No. 4,799,062, Sanderford et al disclose a radio location method that uses a central processing station, a plurality of signal repeater base stations with fixed, known locations, and a mobile station with a known location at any time. The central station transmits a master grid synchronization pulse, which serves as a time reference, to the other stations at a selected sequence of times. A roving station with unknown location transmits a pulse that is received by three or more base stations and is retransmitted to the central station. The central station determines the location of the roving station using the differences in time of arrival at each base station of the pulse transmitted by the roving station. The mobile Station also transmits a pulse from time to time, and its known location is compared with its computed location by the central station to determine any multipath compensation required to reconcile the known and computed locations of the mobile station. The multipath compensation for a mobile station adjacent to the roving station is applied to correct the computed location of the roving station.

Ma, in U.S. Pat. No. 4,816,769, discloses receipt of SCA FM subcarrier signals for digital data paging at a radio receiver. The system measures signal-to-noise ratio of an output amplitude of a Costas loop, used to phase lock to the FM subcarrier frequency, to determine if the signal is sufficiently strong to be processed.

A system for detection of radiowave propagation time, disclosed by Ichiyoshi in U.S. Pat. No. 4,914,735, uses detection of phase differences for transmission of the signal over M ($\geq 2$) different known signal paths to a target receiver. The transmitted signal includes a subcarrier signal, having a frequency that is higher than the transmitter clock frequency, modulated with a known modulation signal. The receiver has M demodulators for the signals received by the M different paths and has a phase comparator to compare the computed phases for each of these received signals. The phase differences are proportional to the signal path length differences, if compensation for transmission line distortions is included.

U.S. Pat. No. 5,023,934, issued to Wheeless, discloses a system for communication of graphic data using radio subcarrier frequencies. The data are broadcast on a subcarrier channel and received by a radio receiver that is connected to a computer. The computer receives the subcarrier signals, displays the graphic data on a computer screen, and performs other functions, such as transmission error checking and modification of the displayed graphic dam. The system is intended for weather data communication and display.

Westfall, in U.S. Pat. No. 5,073,784, discloses a system for location of a transmitter ("unknown") at large distances, using a large network of pairs of spaced apart radiowave receivers whose locations are known and whose relative phases are synchronized. A signal, broadcast by the unknown transmitter at less than HF frequencies, is received at different time and space points by pairs of receivers. Simple geometrical computations allow determination of the location of the unknown transmitter by comparing times of arrival of the transmitted signal.

U.S. Pat. No. 5,170,487, issued to Peek, discloses use of FM sub-carrier signals for a pager system for mobile users. A plurality of transmitters are used, each of which transmits an FM subcarrier signal or a carrier signal modulated with a chosen message signal, slightly offset in time. Each page-receiving unit is assigned a time slot, during which the receiving unit dials through the set of frequencies corresponding to the FM subcarrier and modulated-carrier signals to determine if a page message has been sent for that mobile user.

A system that allows determination of an absolute location of a vehicle is disclosed by Kelley et al in U.S. Pat. No. 5,173,710. FM subcarrier signals are received from three radio stations with known locations but unknown relative phases by signal processors at the vehicle and at a fixed station with known location relative to the three radio stations. The fixed station processor determines the relative phases of the three radio stations FM subcarrier signals and broadcasts this relative phase information to the vehicle. The vehicle processor receives this relative phase data and determines its absolute location, using the phases of the FM signals it senses at its own location.

Chon, in U.S. Pat. No. 5,193,213, discloses an FM broadcast band system for receipt of relatively high frequency FM subcarrier signals. A tunable high pass receiver first circuit receives the carrier and a tunable low pass second circuit receives the subcarrier signal. Each signal can then be separately processed.

A navigation and tracking system using differential LORAN-C or differential Decca signalling is disclosed by Duffett-Smith in U.S. Pat. No. 5,045,861. A reference station transmits a reference signal to a mobile station and to three or more local LORAN-C or Decca (fixed) stations having known locations relative to the reference station. The fixed stations retransmit the reference signal to the mobile station, where the phase received signal differences are compared to determine the location of the mobile station.

Most of these systems use a single communication system, rather than integrating two or more communication systems to provide location or navigation information for a mobile user. What is needed is an integrated location determination system for automatically or discretionarily determining the present location of a mobile user at a designated site, whether the user is presently outside or inside a building or other structure. Preferably, the system should include an appliance to be worn or carried by a prisoner, arrestee or confinee (collectively referred to as an "arrestee" herein) that will: (1) allow selected arrestees to live on designated sites outside a conventional prison for at least a portion of their confinement time; (2) detect with masonable accuracy the present location of the arrestee at arbitrarily chosen times with time interval lengths as short as one second; (3) detect when the arrestee crosses a designated boundary and attempts to leave a designated site and provide a first alarm at that time; (4) detect when tampering with the appliance is occurring and provide a second alarm; (5) allow the arrestee to leave the designated site at prescribed times to seek medical attention or attend to other needs, while continuing to monitor the present location of the arrestee; and (6) allow easy and flexible redefinition of a boundary of a designated site.

SUMMARY OF THE INVENTION

These needs are met by the invention, which provides a system and associated apparatus that allows an arrestee to be confined to a designated site outside a conventional prison or other confinement facility for at least a portion of the arrestee's confinement time. The arrestee wears a location-determining (LD) unit that cannot be removed, except by specially trained persons, and that provides information on the arrestee's present location at each of a sequence of time intervals that may vary in length from a fraction of a second to hundreds or thousands of seconds, as desired. This LD unit receives radiowave or similar signals that provide information used to determine the present location of the LD unit, and the wearer thereof. The inaccuracy of this present location information is preferably no greater than one meter and may be as small as 10 centimeters.

In one embodiment, the appliance processes this information, determines this present location, and transmits this information to a central station that monitors the present location of one or many arrestees, each of whom may be located at a single site or at separate sites. In another embodiment, the LD unit does not process this information, or partly processes this information, and transmits this information to the central station for further processing to determine the present location of the arrestee. The central station compares the present location of the arrestee with the designated site and its boundary to determine if the arrestee is staying on this site. If the arrestee has moved off the site without prearranged permission, or if no intelligible response signal is received at the proper times, the central station promptly notifies the appropriate authorities. Alternatively, the central station can activate some portion of the appliance worn by the arrestee and temporarily disable the arrestee until the authorities arrive.

Optionally, the LD unit contains a tamper detection circuit that transmits a distinguishable alarm if tampering is detected. Optionally, the appliance transmits the present location information in an encrypted form that cannot be read or interfered with by the arrestee, except by making the transmitted signal unintelligible and thus triggering an alarm at the central station.

The arrestee appliance may receive FM subcarrier signals from a plurality of three or more subcarrier transmitters with known locations and determinable phase relationships. The phase differences of the sub-carrier signals provide information to determine the present location of the appliance.

Alternatively, the LD unit may receive radiowave signals from an "outdoor LD system", including a plurality of three or more ground-based location determination signal sources, such as Loran, Omega, Decca, Tacan, JTIDS Relnav, PLRS, or including a plurality of satellite-based location determination signal sources (SATPS), such as GPS or GLONASS, with known locations and determinable phase relationships, using phase analyses similar to analyses used for the FM subcarrier signals. Other sets of three or more radiowave signals with known source locations and selected signal parameters may also be used. The FM subcarrier unit and the outdoor LD unit are integrated in an LD unit that receives FM subcarrier signals and outdoor LD signals. The central station or another station can serve as a reference station and the appliance can serve as a mobile station in a differential positioning mode using the outdoor LD system.

BRIEF DESCRIPTION OF THE DRAWINGS

FIG. 10 is a schematic view illustrating use of the invention to provide one or more exclusion regions R' where the site arrestee is not permitted to go under any circumstances.

DESCRIPTION OF BEST MODE OF THE INVENTION

Figure 1:
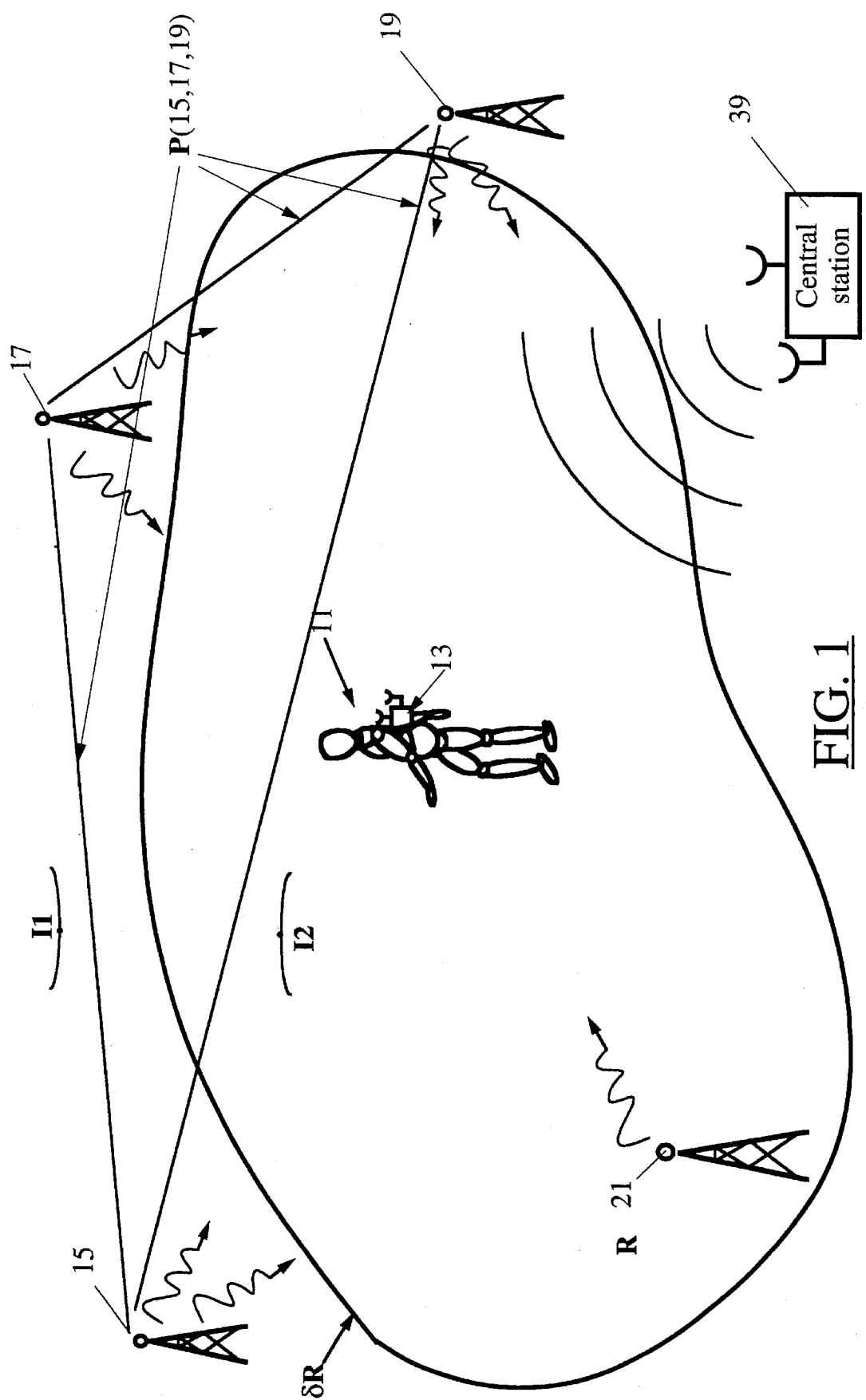
FIG. 1 is a schematic view of operation of one embodiment of the invention in a designated region or site R.

FIG. 1 illustrates practice of one embodiment of the invention. A site arrestee 11 lives and works at or is confined to a designated site or region R having a boundary δR. The arrestee 11 wears a portable location determination (LD) unit 13. The LD unit 13 receives FM signals from three or more FM signal sources 15, 17, 19, and 21 (optional) that have locations with known location coordinates $(x_m, Y_m, z_m)$ for FM signal source no. m (m=15, 17, 19, 21). The FM subcarrier signal of interest may have an associated frequency of about $f_c \pm 19$ kHz, where $f_c$ is the FM carrier frequency that lies in the range 88–108 MHz. Alternatively, a higher order displacement from the carrier frequency (e.g., $f_c \pm 38$ kHz or $f_c \pm 57$ kHz) may be used. The sources of these FM subcarrier signals may be a plurality of FM broadcasting stations located in or near the site R. In this event, the subcarrier signals are obtained by filtering the total FM signals (carrier signal plus message signal plus subcarrier signal) to remove all but a subcarrier signal of a chosen frequency.

Figure 2:
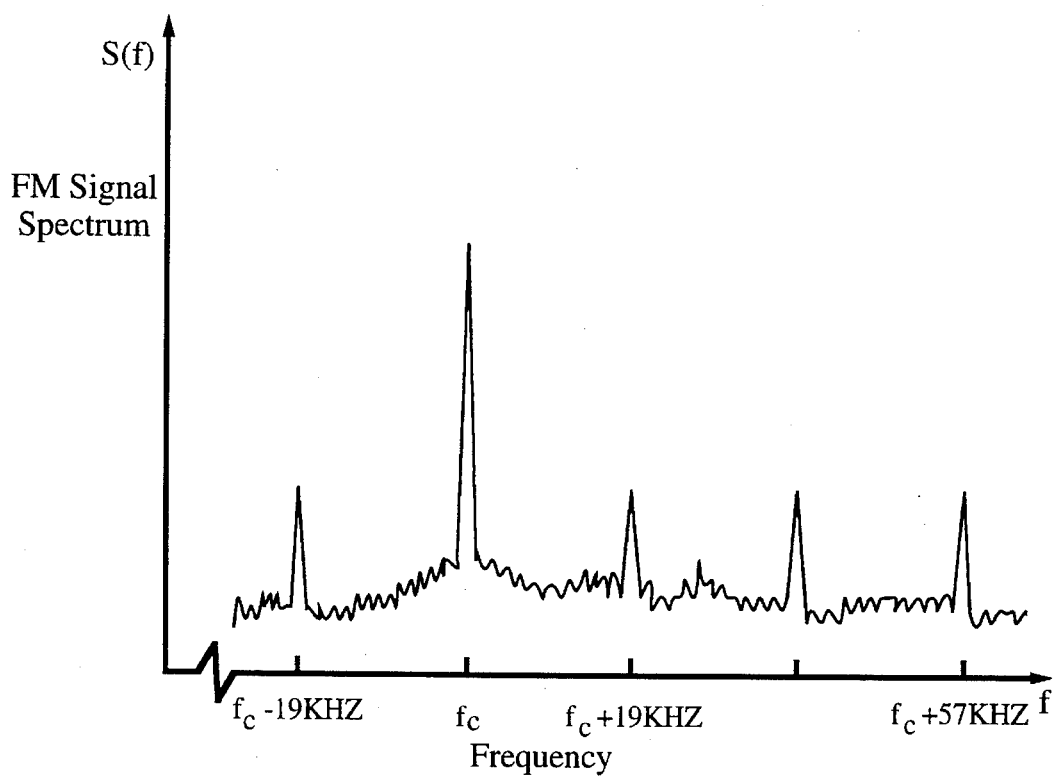
FIG. 2 is a graph illustrating a typical FM signal spectrum near the carrier frequency $f_c$ used for that signal.

FIG. 2 illustrates the full FM signal spectrum and the useful portion of the signal that remains (e.g., $f_c \pm 19$ kHz) after frequency filtering. FM subcarrier signals can be used for all monitoring of the present location of the arrestee 11, inside and outside buildings and other structures. This approach has the advantage of simplicity: only one set of radiowaves is used for location determination. FM signals are less subject to noise and other interference than are other signals, such as AM signals. Alternatively, an FM subcarrier signal can be replaced by an AM subcarrier signal, which is obtained by filtering an AM signal at a frequency displaced from the AM carrier frequency by a relatively small amount. More generally, determination of the present location of the arrestee 11 can be made using a location determination (LD) unit that receives and analyzes LD radiowave signals transmitted from one or more LD signal sources.

Figure 3:
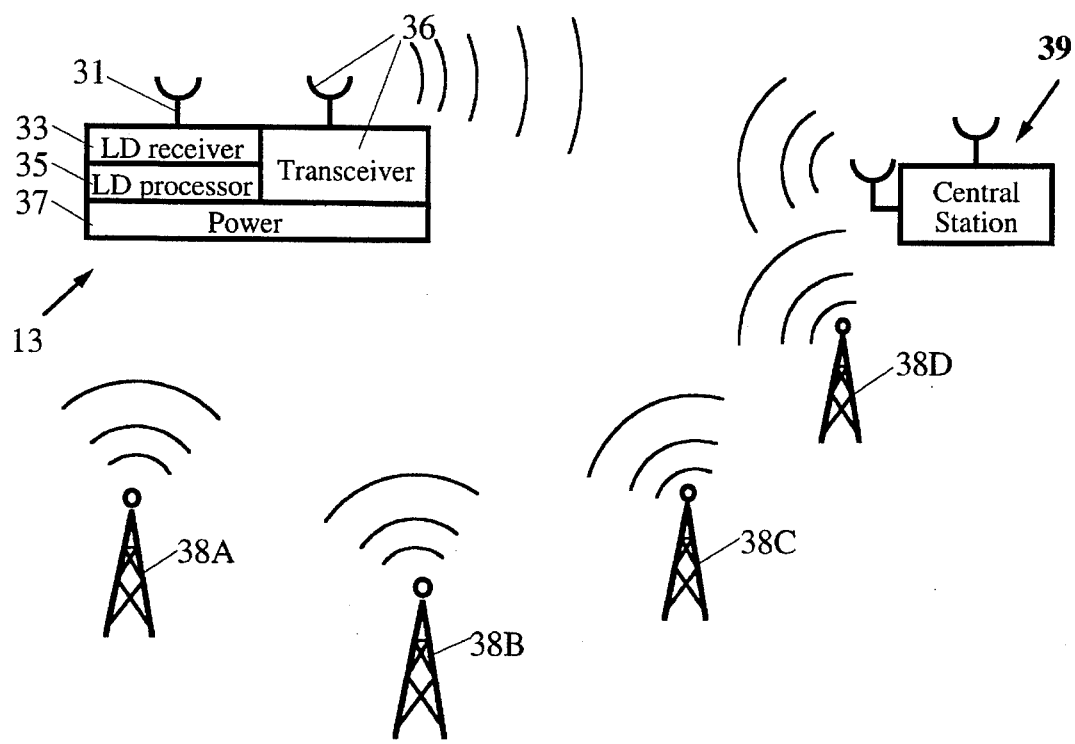
FIG. 3 is a schematic view illustrating use of a location determination unit that transmits and processes FM subcarrier signals, to determine the present location of a designated person according to the invention.

An LD unit 13, shown in FIG. 3, that is carried by or attached to the arrestee 11 includes an LD antenna 31, an LD signal receiver 33, an LD signal processor 35, a signal transceiver 36 connected to the processor, and power supply 37, for receiving certain LD radiowave signals from one or more LD signal source 38A, 38B, 38C and/or 38D. Information from these LD signals may be transmitted, unprocessed, by the transceiver 36 to a central processing station 39, located at or spaced apart from the site R, to allow determination of the present location of the arrestee 11 periodically (e.g., second-by-second, or more or less often, if desired). In a first mode of operation of the LD unit 13, all signal processing occurs at the central station 39, and the LD signal processor 35 may be deleted. Alternatively, the LD signals received by the LD unit 13 may be partly or fully processed by the LD signal processor 35 to partly or fully determine the present location of the LD unit. This processed information may be transmitted to the central station 39 for final determination of the present location of the arrestee 11.

If the arrestee 11 is outdoors or is within any building or other structure that is not electromagnetically isolated, the LD signals may have any frequency, and GPS, GLONASS, Loran, Omega, Decca, Tacan, JTIDS Relnav, PLRS, FM subcarrier signals, AM subcarrier signals or other radiowave signals may be used. If the arrestee 11 is within an electromagnetically isolating structure, FM subcarrier signals may often still be received within the structure without disabling signal attenuation or signal distortion.

In the embodiment illustrated in FIG. 1, the invention uses FM subcarrier signals emitted by three or more spaced apart FM signal sources 15, 17 and 19, positioned at known locations in the community, together with an FM signal monitor (and, optionally, source) 21 that is also located at a known location 00. If the FM signal monitor 21 also serves as a source, this source is preferably separated by a large distance from a plane P(15,17,19) passing through the locations of the other three FM station antennas. In this instance, the source 21 may be located on a very tall tower, for example, relative to the heights of the transmitting antennas of the other FM sources 15, 17 and 19.

The FM signal monitor 21: (1) receives the FM subcarrier signals transmitted by the other FM stations 15, 17 and 19; (2) determines the relative phases of these subcarrier signals at their respective sources, using the known distances of the antennas of each of the other FM stations 15, 17 and 19 from the FM monitor 21; (3) transmits a signal on another selected frequency that advises any FM subcarrier signal receiver of these relative phases; and (4) optionally transmits its own FM subcarrier signal, with a phase determined by an optional selected linear combination of the phases of the other three FM subcarrier signals, or determined independently of the other three phases. The arrestee 11 wears the portable LD unit 13 and is assigned an identifying indicium that is included in any transmission by that LD unit to the central station 39. Optionally, the central station 39 can continually or periodically advise a communications, command and control (C3) center of the location of the arrestee 11, or of the locations of several such persons.

The LD unit 13 serves as a mobile station that receives the FM subcarrier signals and optionally transmits phase information for each of these subcarrier signals to the central station 39 for (further) processing and analysis. The central station 39 has a known location relative to each of the FM signal sources 15, 17, 19 and FM signal monitor 21 and can determine the phase of each these FM signals relative to a selected phase reference or can determine the FM signal source phases relative to each other at a selected time. One advantage of use of relatively low frequency FM signals, such as $f_c \pm 19$ kHz, is that such signals are attenuated and/or distorted less, in passing through apertures, walls, floors and ceilings of normal buildings, than are higher frequency radiowave signals, such as AM signals. In normal circumstances, the relative phases of the FM signal sources 15, 17, 19 and FM monitor 21 would not change, or would change at most a few times in any 24-hour period. However, the invention provides for the possibility that these relative phases can change often and/or quickly.

At or around a given time t=t0, the FM subcarrier signals broadcast by the FM sources 15, 17, 19 and FM monitor 21 (optional) are $$S_m(t) = S_0 \exp[j(\omega_m t - \phi_m)] \quad (m=15, 17, 19, 21) \quad (j^2 = -1), \tag{1}$$

where $\omega_m$ and $\phi_m$ are the subcarrier frequency and present phase of the FM signal Source number m. The subcarrier frequencies $\omega_m$ are preferably distinct from and spaced apart from one another. Optionally, the signal $S_m(t)$ may itself be modulated with a known signal to produce a signal $S_{m,mod}(t)$ that is different for each source (m) and that allows identification of each source signal, independently of whether the subcarrier frequencies are distinct. The subcarrier signals are received at the LD device 13 as time-varying signals of the form $$S'_m(t)=S_0\exp[j(\omega_m t-\phi_m \omega_m d_m/c')] \; (m=15, 17, 19, 21), \quad (2)$$

where c' is the average propagation velocity in the transmission medium (mostly air) and $$d_m=[(x-x_m)^2+(y-y_m)^2+(z-z_m)^2]^{1/2} \quad (3)$$

is the distance from the FM signal source number m to the LD unit 13, whose present location coordinates (x, y, z) are as yet undetermined.

If the phases $\phi_m$ are known, the distances $d_m$ can be determined from Eq. (2). From any three physically realistic three distances, such as $d_{15}$, $d_{17}$ and $d_{19}$, two candidate location coordinate triples (x,y,z) can be found that, in principle, satisfy Eqs. (3) for measured distances $d_m$ (or phases $\phi_m$). Adding the distance $d_m$ of a fourth FM subcarrier signal source, such as 21, will, in principle, allow elimination of one of these two candidate triples so that only one location coordinate triple (x, y, z) remains for the present location of the LD unit 13. In practice, this scheme will not work well if the four FM signal sources lie approximately in a plane or in a line and the present location of the LD device 13 also lies close to or in that plane or that line. Preferably, one of the four FM signal sources, optional FM source 21, should be spaced far apart from the plane passing through the locations of any three other FM signal sources 15, 17 and 19. This formalism can be used for FM carrier or subcarrier signals or for AM carrier or subcarrier signals. This formalism can also be used for electromagnetic signals of any frequency emitted by a ground-based distance measuring system, such as Loran, Omega, Decca, Tacan, JTIDS Relnav or PLRS, or a Satellite Positioning System (SATPS), such as GPS or GLONASS, collectively referred to herein as an "outdoor LD system."

In one cycle of an FM subcarrier signal of frequency $f_m=f_{c,m}\pm19$ kHz (m=15, 17, 19, and optionally 21), an electromagnetic wave will move a distance equal to one wavelength $\lambda=c'/\omega_m$, or about 15.8 kilometers (km) in a vacuum. Thus, the distance of the LD device 13 from each FM signal source is known modulo 15.8 km. This distance ambiguity can be removed by initialization techniques. For example, if the designated site R has a diameter that is $\ll15.8$, the present location of the arrestee 11 can be determined at one location on the site R, with one set of FM signal source phases, and can be used for all locations on or adjacent to the site R by determining phase changes for each signal relative to this initial location. That is, the phase $\phi_m$ is initially determined at a time t=t0 for each FM or other location signal transmitter, using Eq. (2) or another suitable relation to determine the absolute or relative phases of the signals arriving from the signal source m at a known location, the initial location of the arrestee 11 on the site R.

Assume that FM signal source number m (m=15, 17, 19, and optionally 21) has known coordinates $(x_m, Y_m, z_m)$. From the determinable phase differences of the signals arriving from each FM source at a selected location with as-yet-undetermined coordinates (x,y,z) (such as the present location of the arrestee 11), source number m is determined to lie at a distance $d_m$ from the selected location. FM subcarrier signals, emitted from FM sources 15, 17, 19 and 21 (optional) with synchronized phases, would arrive at the selected location with time differences $\Delta t_{ij}$ or source-to-source phase difference $\Delta\phi_{ij}$ ($i \neq j$; i, j=15, 17, 19, 21) that are determined by $$\Delta\phi_{ij}=2\pi(d_i-d_j)f/c'=f\Delta t_{ij}/c', \quad (4)$$

$$d_i=[(x-x_i)^2+(y-y_i)^2+(z-z_i)^2]^{1/2}, \quad (5)$$

where c' is the velocity of light propagation in the ambient medium and f is the frequency of the FM subcarrier signals. The three phase differences $\Delta\phi_{ij}$ ($i \neq j$; i,j=15, 17, 19) define three intersecting hyperboloids or similar quadratic surfaces, each having two sheets. In general, the common intersections of each of these three groups of sheets should define a point or segment of a curve, where the two points (or curve segments) I1 and I2 shown in FIG. 1 are mirror images of each other with respect to the plane P(15,17,19) defined by the coordinates $(x_i,y_i,z_i)$ of the ith transmitter of the FM subcarder signals. A fourth FM subcarrier signal source 21 (optional), because it is displaced from and does not lie on the plane P(15,17,19), transmits FM subcarrier signals that have two distinct phase differences at the intersection points I1 and I2. This fourth FM subcarrier signal can thus distinguish between I1 and I2 and allow determination of the correct coordinates (x,y,z) for the selected location. This assumes that the phases of the four FM subcarrier signals are synchronized, with zero phase differences or known phase differences between any two of these signals. In practice, each of the four FM subcarrier signal sources will have a phase that may drift with time or change abruptly at particular times.

Where the four FM subcarrier signals have different phases, these source phase differences $\Delta\Phi_{ij}$ must be determined and removed before Eq. (4) can be used to determine the location coordinates (x,y,z) of the selected location. The phase differences $\Delta\Phi_{ij}$ can be determined by providing an FM subcarrier signal monitor station 21 that receives the other three FM subcarrier signals (i=1, 2, 3 in this example) and determines the phase differences $\Delta\Phi_{i,21}$. The FM monitor 21 uses its knowledge of the separation distances between itself and the (other) FM subcarrier signal sources and of the measured signal phase differences at the monitor from the other three FM subcarrier signals. As noted above, the phase differences $\Delta\Phi_{i,21}$ may vary with time, through drift, abrupt change, or both. The FM signal monitor station then broadcasts the phase differences $\Delta\Phi_{i,21}$, preferably with a different carrier frequency than any FM subcarrier frequency, and these phase differences are received and stored and/or processed by a receiver at the LD unit 13. This LD unit 13 also receives the FM subcarrier signals and determines the "raw" or uncompensated phase differences $\Delta\phi_{ij}$ at its location (i, j=15, 17, 19). A signal processor associated with this receiver then forms the "true" or compensated phase differences $$\Delta\phi_{15,21}=2\pi(d_{15}-d_{21})/c'\Delta t-\Delta\Phi_{15,21}, \quad (6)$$

$$\Delta\phi_{17,21}=2\pi(d_{17}-d_{21})/c'\Delta t\Delta\Phi_{17,21}, \quad (7)$$

$$\Delta\phi_{19,21}=2\pi(d_{19}-d_{21})/c'\Delta t-\Delta\Phi_{19,21}. \quad (8)$$

This compensates for non-synchronization and possible drifting of the FM subcarrier signals transmitted by the four FM subcarrier signal sources. However, compensation is provided with respect to one of the four FM subcarrier signals, whose own phase may change with time.

Use of an FM signal monitor, which does not otherwise participate in determination of the selected location coordinates (x,y,z), to determine the phase differences $\Delta\phi_{ij}$ (i,j=15,17,19) is disclosed in U.S. Pat. No. 5,173,710 issued to Kelley et al, which is incorporated herein by reference. The FM source phase differences $\Delta\Phi_{ij}$ can be measured using a digital phase-locked-loop at the additional FM receiver/transmitter, as disclosed in FIGS. 4–11 and the accompanying text in the Kelley et al patent. In the subject invention, the FM signal monitor 21 used for monitoring the source-to-source phase differences optionally provides a fourth FM subcarrier signal (j=21), and the phase differences of the other three FM subcarrier signals are determined relative to the phase of the FM subcarrier signal transmitted by the FM signal monitor 21.

The FM signal monitor 21 can also serve as a reference station with accurately known location for differential position computations for determining the present location of the outdoor LD signal antenna. Differential position techniques use the known location of the reference station to remove some of the errors contained in signals received by a mobile station, such as the arrestee 11, that is located within a few tens of kilometers from the reference station. Differential GPS techniques are discussed in Tom Logsdon, *The NAVSTAR Global Positioning System*, Van Nostrand Reinhold, 1992, pp. 76–90. Differential Loran techniques are discussed in U.S. Pat. No. 5,045,861, issued to Duffet-Smith, which is incorporated by reference herein. Thus, the FM signal monitor station 21 can include an outdoor LD herein. Thus, the FM signal monitor station 21 can include an outdoor LD signal antenna and associated outdoor LD signal receiver/processor, to receive the outdoor LD signals and to determine any location error values contained in these signals by comparison of the calculated location with the known location of the reference station. The FM signal monitor 21 can also include a transmitter to transmit these error values to a receiver/processor at the outdoor LD signal unit so that the calculated present location of the outdoor LD signal antenna can be adjusted by removal of outdoor LD signal errors that have been determined from the signals received at the FM signal monitor station 21 (which also serves as an outdoor LD signal reference station). Compensation for outdoor LD signal errors can be provided at the reference station 21 or at the outdoor LD unit.

Figure 4:
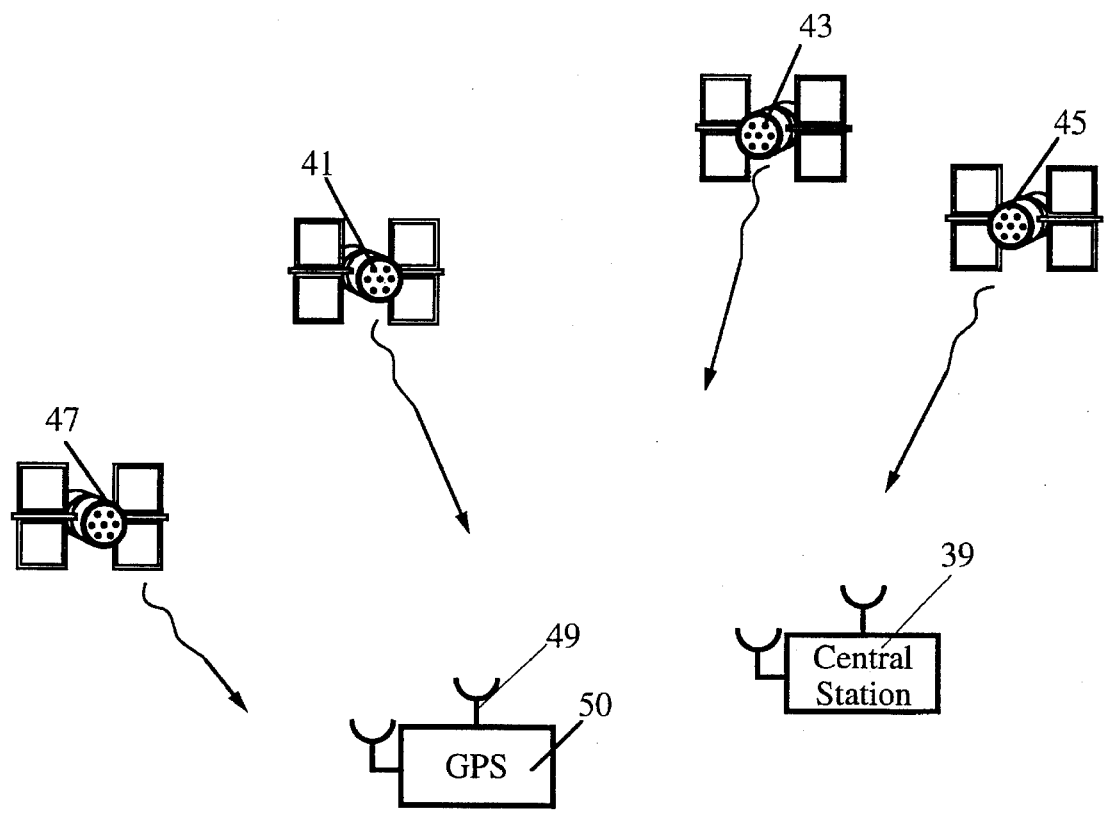
FIGS. 4 and 5 are schematic views illustrating use of outdoor location determination systems, using satellite-based signals and using ground-based signals, respectively, to determine the present location of a location determination unit according to the invention.

The location coordinates (x,y,z) of the LD unit 13 carried by the arrestee 11 are now known. The FM signals indicated in FIGS. 1 or 3 may be used outside as well as inside a building or other structure to allow determination of the present location of the arrestee 11. Alternatively, FM signals may be used for inside-the-building location reporting and may be supplemented for outside-the-building location reporting by supplemental signal sources. One suitable outdoor LD signal source, illustrated in FIG. 4, is a Global Positioning System (GPS) or Global Navigation Orbiting System (GLONASS) or similar satellite-based location determination system (collectively referred to as GPS herein). A GPS includes a plurality of three or more visible, Earth-orbiting, non-geosynchronous satellites 41, 43, 45, 47 that each transmit a continuous, distinguishable electromagnetic signal that is received by a GPS antenna 49 and associated GPS signal receiver/processor 50 on or near the Earth's surface. The GPS receiver/processor 50 determines the present location of the GPS antenna by suitable processing of three or more GPS signals received from the GPS satellites 41, 43, 45, 47. A GPS and a GLONASS are discussed in more detail below. Global Positioning System signals are available throughout the world, whereas FM signal reception is often limited to line-of-sight reception, with a representative maximum reception distance of about 50 kilometers. A Global Positioning System is discussed in detail in Tom Logsdon, *The NAVSTAR Global Positioning System*, Van Nostrand Reinhold, 1992, pp. 17–90; the information from this material is incorporated herein.

Because the GPS signals use a high frequency carrier (above 1 GHz), these signals may be severely attenuated and/or distorted if such signals are received inside a building or other structure that is partly or fully electromagnetically insulating. For this mason, a GPS may be unsuitable for determination of the present location of a GPS antenna that is positioned within such a building or similar structure. However, the combined use of FM signals for location determination inside a building or similar structure (e.g., a deep shaft mine or tunnel under or through the Earth) plus GPS signals for location determination outside a building or similar structure can provide a satisfactory LD system in most urban and non-urban communities.

Figure 5:
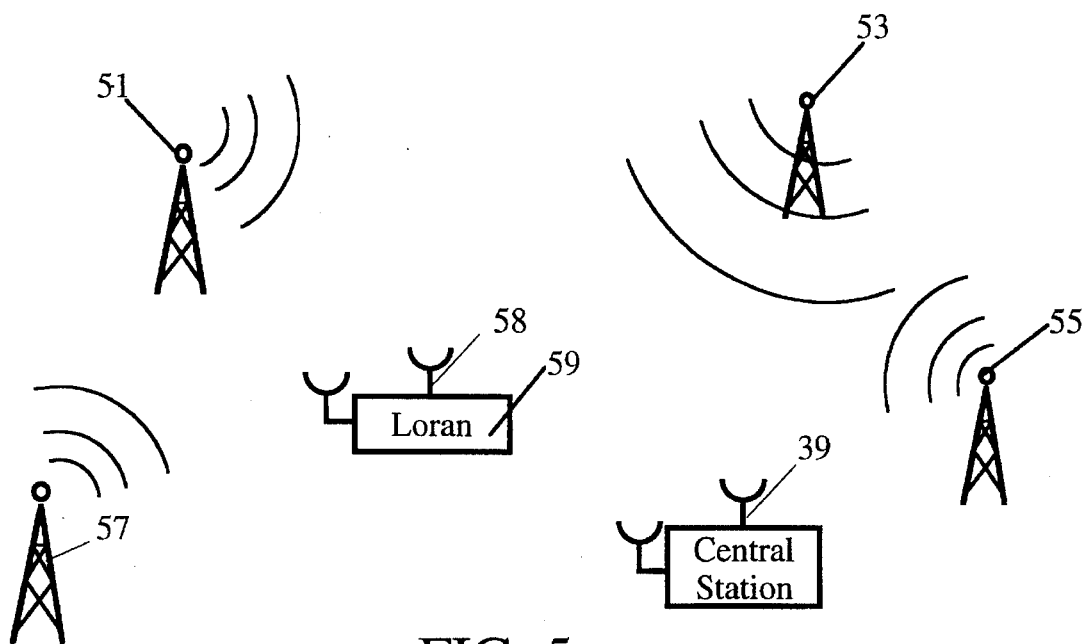

Alternatively, the GPS signals may be replaced by Loran-C signals produced by three or more Loran signal sources positioned at fixed, known locations, for outside-the-building location determination, as illustrated in FIG. 5. A Loran-C system relies upon a plurality of ground-based signal towers 51, 53, 55 and 57, preferably spaced apart 100–300 km, that transmit distinguishable electromagnetic signals that are received and processed by a Loran signal antenna 58 and Loran signal receiver/processor 59. A representative Loran-C system is discussed in *Loran-C User Handbook*, Department of Transportation, U.S. Coast Guard, Commandant Instruction M16562.3, May 1990, which is incorporated by reference herein. Loran-C signals use carrier frequencies of the order of 100 kHz and have maximum reception distances of the order of hundreds of kilometers. The combined use of FM signals for location determination inside a building or similar structure plus Loran-C signals for location determination outside a building or similar structure can also provide a satisfactory LD system in most urban and suburban communities.

Other ground-based radiowave signal systems that are suitable for use as part of an LD system include Omega, Decca, Tacan, JTIDS Relnav (U.S. Air Force Joint Tactical Information Distribution System) and PLRS (U.S. Army Position Location and Reporting System) and are summarized in Logsdon, op. cit., pp. 6–7 and 35–40.

Other radiowave signals, such as emergency band signals in the frequency ranges 12.23–13.2 MHz, with suitable signal timing and a signal indicium included therein, can be used as a source of LD signals for outdoors locations. For convenient reference, a satellite-based or ground-based location determination system, not including a system that uses FM subcarrier signals or AM subcarrier signals, that can be used to determine the location of a arrestee 11 over relatively long distances outside a building or other structure over the region R will sometimes be referred to as an "outdoor LD system".

Figure 6:
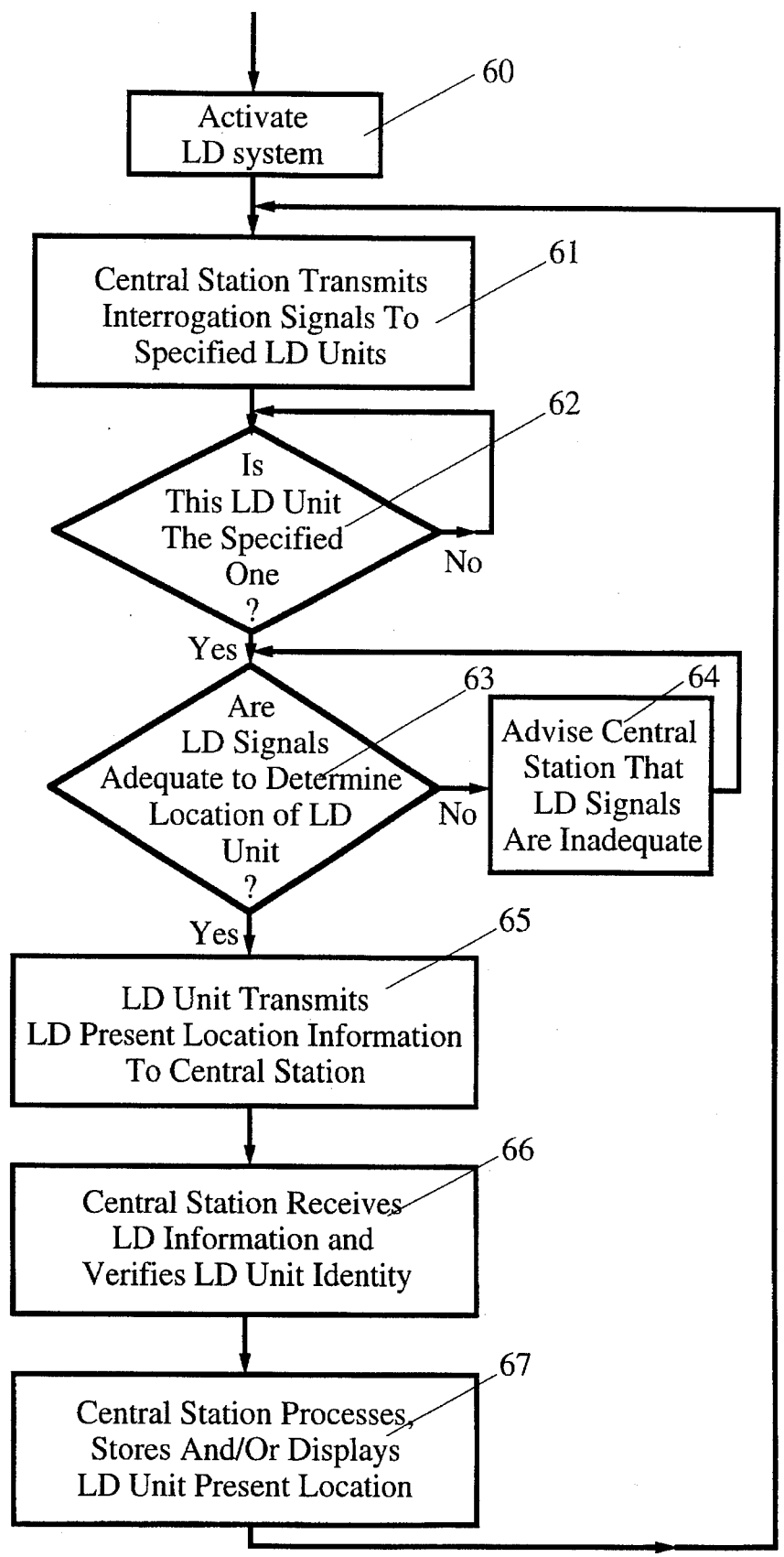
FIG. 6 is a flow chart illustrating a suitable procedure, according to the invention, for determining the present location of a location determination unit, using only FM subcarrier signals.

FIG. 6 is a flow chart of a procedure that can be used to determine the present location of the arrestee 11, if an FM subcarrier system is used for all location determinations inside and outside buildings and other structures in a region R. In step 60, the LD system is activated and made ready to determine the present location of an arrestee 11. A central station or other interrogator transmits an interrogation signal (e.g., "Where are you?") in step 61, with an identifying label, tag or indicium attached that specifies the identified arrestee 11, or specifies the LD unit 13 carried by that person. In step 62, each LD unit determines if it is the LD unit specified by the central station's interrogation signal. If a given LD unit is not the specified unit, that LD unit ignores this interrogation signal and recycles until receipt of the next interrogation signal. If the LD unit carried by the identified arrestee 11 is the specified unit, this unit optionally determines if the FM subcarrier signals received are adequate to determine the present location of the LD unit, in step 63. If the FM subcarrier signals are inadequate, the LD unit optionally advises the central station of this circumstance, in step 64.

Assuming that the FM subcarrier signals are adequate to determine the present location of the LD unit or that steps 63 and 64 are absent in the flow chart of FIG. 6, the LD unit responds, in step 65, by transmitting to the central station the last location fix computed by that LD unit and any other relevant and available information on the identified arrestee's condition or circumstance. Preferably, the specified LD unit responds by transmitting the requested information to the central station in a time slot (of length 10–200 msec) allocated for this response. Preferably, the responding LD unit also includes a label, tag or other indicium identifying the responding LD unit. The central station receives the response signal from the LD unit and verifies that this signal carries the correct LD unit indicium, in step 66. In step 67, the central station processes, stores and/or visually or audibly displays information on the specified LD unit present location.

This procedure would be followed irrespective of whether the LD unit 13 is presently inside or outside a building or other structure, because only one LD system (FM subcarrier system) is providing the LD information. Alternatively, the LD unit can partly process the FM subcarrier signals and can transmit this partly processed information to the central station 39 for further signal processing and determination of the LD unit's present location. As a second alternative, the LD unit can automatically retransmit, unprocessed, or partly processed suitable information (timing, relative phases, etc.) that the LD unit is receiving from each of the FM subcarrier signal sources and allow the central station to do all LD signal processing.

Figure 7:
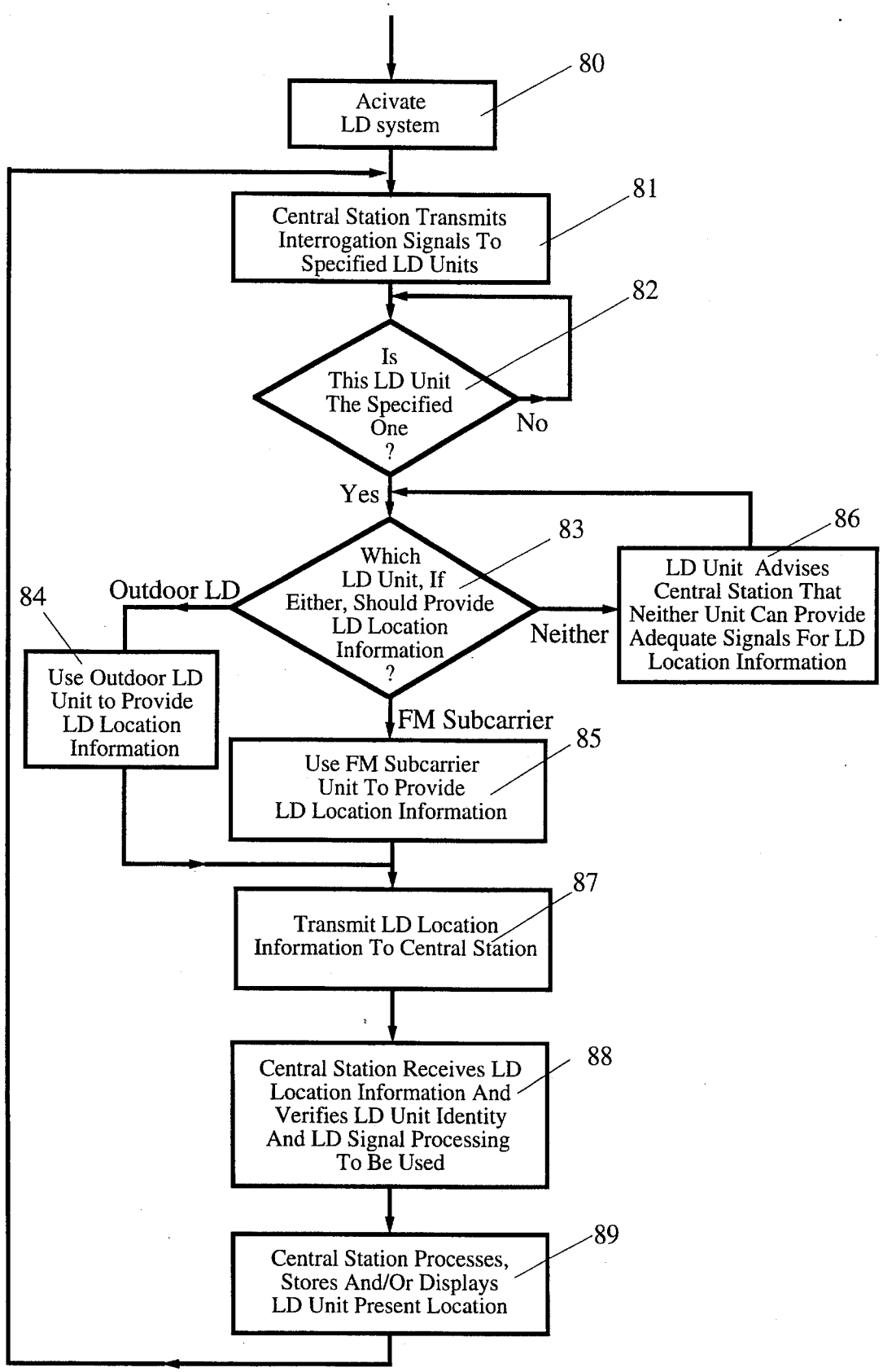
FIG. 7 is a flow chart illustrating a suitable procedure, according to the invention, for determining the present location of a location determination unit, using a combination of FM subcarrier signals and signals generated by an outdoor location determination system.

FIG. 7 is a flow chart of a procedure that can be used to determine the present location of each arrestee 11, where a combination of FM subcarrier signals and signals provided by an outdoor LD system are used for location determination. The LD system is activated in step 80. The central station interrogates a specified LD unit by transmitting an interrogation signal with a label, tag or other indicium that identifies that LD unit, in step 81. Each LD unit receives this interrogation signal and determines if the interrogation signal is directed to that LD unit, in step 82. If a given LD unit is not the one specified by the interrogation signal, that LD unit ignores the interrogation signal and recycles until the LD unit receives another interrogation signal.

If a given LD unit is specified in the interrogation signal, that LD unit automatically determines, in step 83 of FIG. 7, whether the LD information should be provided by the outdoor LD unit, by the FM subcarrier unit, or by neither, based upon the present location of that LD unit and/or an indicium for each FM subcarrier signal and for each outdoor LD signal that indicates which of the two signals is likely to provide the most accurate location under the circumstances. The indicium for each signal preferably is a measure of the signal robustness, such as signal strength, or the signal quality, such as signal-to noise ratio. Use of such indicia is discussed in the patent application entitled "Hybrid Location Determination System", U.S. Ser. No. 08/171,557 (abandoned), assigned to the assignee of this application. In some circumstances, neither the FM subcarrier signals nor the outdoor LD signals may provide acceptable signals for location determination, and the LD unit optionally advises the central station of occurrence of this circumstance, in step 86.

If the LD unit is located outside of and away from all buildings and structures, the LD unit can use the outdoor LD unit to provide LD information on its present location, as in step 84, or can use the FM subcarrier unit for this purpose. If the LD unit is located inside a building or other structure or in another location that is inaccessible to outdoor LD system signals, the FM subcarrier unit provides present location information for the LD unit, in step 85. If neither the FM subcarrier signals nor the outdoor LD signals are adequate for location determination, the LD system advises the central station of this, in step 86. In step 87, the LD unit transmits to the central station its LD information, unprocessed, partly processed or fully processed, preferably including a first label, tag or other indicium that identifies the responding LD unit and a second label, tag or other indicium indicating which, if any, of the two LD systems has provided the LD information. Optionally, the LD unit can transmit the requested information to the central station in an allocated time slot (of length 10–200 msec) for this response. In step 88, the central station receives the information transmitted by the LD unit, verifies the identity of the responding LD unit, and determines which signal processing route to use, based in part on which LD system has provided the LD information. The central station processes, stores and/or visually or audibly displays the present location of the specified LD unit, in step 89.

Figure 8:
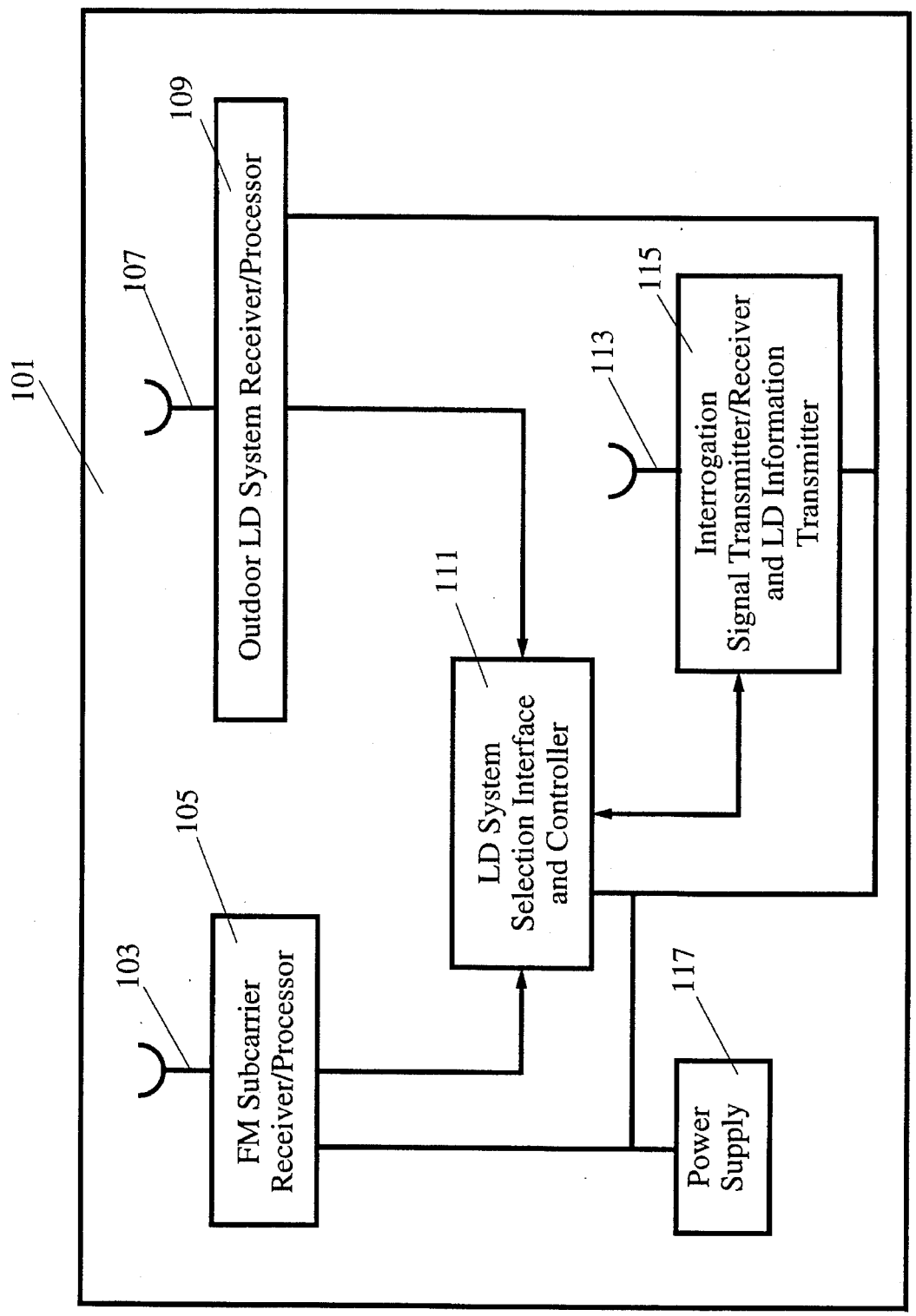
FIG. 8 is a schematic view of a location determination unit that receives and processes FM subcarrier signals and signals from an outdoor location determination system.

FIG. 8 is a schematic view of a portable location determination unit 101 that may be used to practice the invention, where a combination of FM subcarrier signal system and an outdoor LD system are used to determine location of an LD unit in the region R. The LD unit 101 includes an FM subcarrier signal antenna and receiver/processor 103 and 105, an outdoor LD system antenna and receiver/processor 107 and 109, with each of the receiver/processors being connected to an LD unit interface and controller 111. The controller 111 receives location signals or other indicator signals from each of the receiver/processors 105 and 109 and determines whether the FM subcarrier signal system or the outdoor LD system, if any, will be selected to respond to receipt of an interrogation signal requesting location information for the LD unit 101. This selection can be based upon the present location of the LD unit 101 or upon one or more signal conditions associated with the signals received and/or processed by each of the receiver/processors 105 and 109. The output signal (the selected location information signal) of the controller 111 is received by an LD signal transmitter and antenna 115 and 113 and is transmitted to the central station that issued the interrogation signal. The LD signal antenna and transmitter 113 and 115 can also serve as the antenna and receiver, respectively, that receive the interrogation signal transmitted by the central station. A power supply 117 supplies electrical power for at least one of the other components in the LD unit 101. If the LD unit 101 is not required to process any of the LD signals received by either of the antennas 103 and 107, the two receiver/processors 105 and 109 can be replaced by signal receivers in FIG. 8. If only the FM subcarrier signals are used to determine the location of the LD unit 101, the outdoor LD system antenna and receiver/processor 103 and 105 and part or all of the controller 111 can be deleted in the LD unit 101.

The location coordinates (x,y,z) of the FM subcarrier signal antenna and receiver/processor carried by the arrestee 11 in FIG. 1 are now known, and these coordinates are compared with the range of coordinates of the region R and its boundary δR. If the arrestee location coordinates (x,y,z) are within the coordinate range of the site R bounded by the boundary δR, the receiver/processor need take no action. If the coordinates (x,y,z) lie elsewhere, the receiver/processor transmits a silent radiowave alarm to the central station 39, indicating that the arrestee has moved beyond the permitted region or site R and indicating the present location coordinates of the arrestee 11. The arrestee's movement within and outside the arrestee site R can thus be tracked by the central station 39.

Alternatively, the present location information for the arrestee 11 can be transmitted, unprocessed or partly processed or fully processed, to the central station 39, which will complete any signal processing needed and will determine if the arrestee location coordinates (x,y,z) lie within or beyond the permitted site R. If these coordinates (x,y,z) lie beyond the permitted site R, or if the central station 39 does not receive K consecutive signals from the LD unit 13 worn by the arrestee 11 (K a selected positive integer), the central station can transmit an alarm or otherwise alert the proper authorities to apprehend the arrestee.

Figure 9:
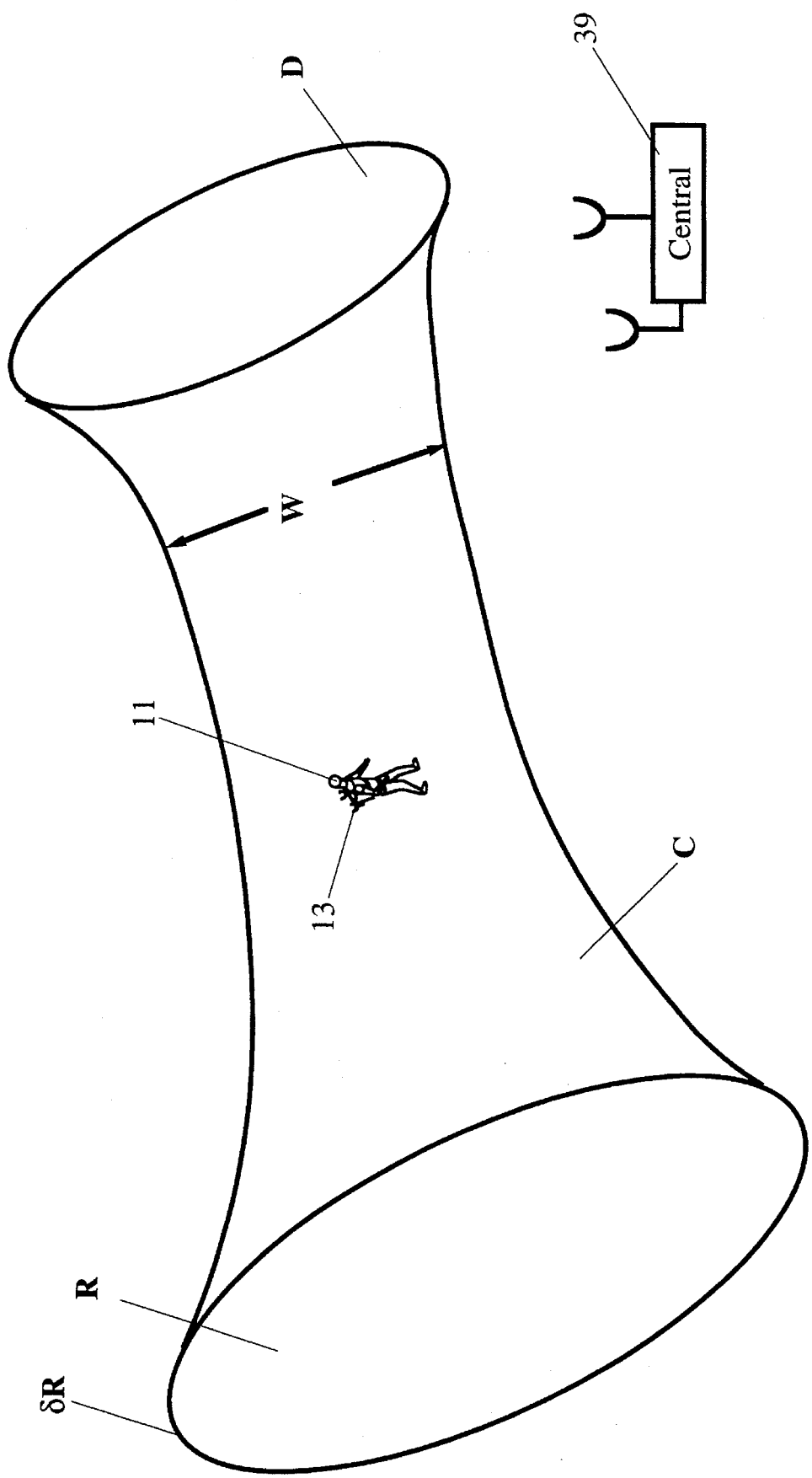
FIG. 9 is a schematic view illustrating use of the invention to provide a corridor C from the site arrestee's usual confinement site R to a permitted destination D that is spaced apart from the site R.

From time to time, the arrestee 11 may need to leave the site R for legitimate needs, such as a visit to his/her physician, a visit to a hospital for emergency or elective medical treatment, or to purchase food or other necessary personal items. In such instance, the site R can be expanded, temporarily, by prearrangement with the central station 39 to include a corridor C connecting the region R to the physician's office or other legitimate destination D for the arrestee, as indicated in FIG. 9. When the arrestee 11 returns to the original site R after the prearranged visit, the corridor C and destination D are deleted and the permitted site again becomes the original site R. Alternatively, the arrestee 11 can be moved from the first permitted site R to the destination site D, and the first permitted site R and the corridor C can be deleted after the arrestee arrives at the new permitted site D. The width W of the corridor C may be as little as 30–40 feet (the width of an average residential street). Alternatively, the width W may be much greater to allow for use of any of two or more alternative paths connecting the original site R to the destination D within the corridor C. The width W may vary along the corridor C. The movements of the arrestee 11 in the corridor C may be timed, and the arrestee may be required to move according to a selected time schedule, with time tolerances optionally included to compensate for reasonable but unexpected time delays in movement between the permitted site R and the destination D.

Alternatively, the site arrestee 11 may be under court order or other constraint to avoid certain locales, such as the homes and/or offices of persons also involved in crimes or other activities for which the arrestee was originally convicted. This could also include the home and/or office of an estranged spouse, victim or witness to commission of a crime in which the arrestee 11 was involved. In this instance, the site or region R would be supplemented at the central station 39 by an exclusion region R', surrounding and including each home, office and/or other facility that the arrestee must avoid at all times, as illustrated in FIG. 10. If the arrestee 11 leaves the site R and crosses a designated boundary δR' of the exclusion region R', the receiver/processor in the LD unit 13 attached to the arrestee notifies the central station 39 of this development by another silent radiowave alarm, and police can be dispatched to intercept the arrestee. Optionally, the receiver/processor in the LD unit 13 could cause the arrestee 11 to become disabled, for example by rendering the arrestee unconscious, using transdermal application across the arrestee's skin of a strong sedative or depressant. Trans-dermal application devices are available from Alza Corp., Palo Alto, Calif., and from other manufacturers in this field.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed in Logsdon, op. cit.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiples $f1=1540\ f0$ and $f2=1200\ f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f ($delay \propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. AH PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 September 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, op. cit.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate =0.511 MHz) and by a P-code (chip rate =5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

We claim:

1. A method for monitoring the location of a site arrestee with reference to a permitted site, the method comprising the steps of:

designating a first site, having a connected and closed curve of arbitrary shape as a first site boundary, as a permitted site, where a selected site arrestee is permitted to remain for a first time interval $t0 \leq t < t1$, where $t0$ and $t1$ are selected times, with $t0 < t1$;

positioning a location-determining (LD) unit on the body of the site arrestee, the LD unit including an antenna and receiver/processor for receiving a timed sequence of radiowave signals from each of three or more electromagnetic signal transmitters whose transmitter locations are spaced apart from each other and from the permitted site and are known with high accuracy, where each of these electromagnetic signals has an identifying indicia and these signals contain information that allows the present location of the LD unit to be determined within the first site or outside the first site entirely by the timing relationships of the sequences of radiowave signals received by the LD unit from the signal transmitters, with no other signal sent or received by the LD unit being used in this determination of the LD unit present location;

providing locking means for locking the LD unit to the arrestee's body so that the LD unit cannot be removed or disabled except by a special means for removal of the LD unit;

providing the LD unit receiver/processor with an electronically sensible map of a selected portion of the Earth's surface that includes the coordinates of the permitted site or of the boundary of the first site;

causing the LD unit receiver/processor to determine, at a selected sequence of two or more interrogation times, the present location of the LD unit and to determine whether the arrestee's present location is within the first site at such interrogation times;

causing the LD unit to communicate an alarm signal if one or more of a specified group of conditions is present;

designating a second site, which has a connected and closed curve of arbitrary shape as a second site boundary and is spaced apart from the first site, and a selected corridor that extends between and is connected to the first site and the second site, where the combined region consisting of the first site, the second site and the corridor has a closed continuous curve of arbitrary shape as a combined region boundary;

redefining, for a second selected time interval $t1 \leq t < t2$, the permitted site to include the first site, the second site and the corridor, where t2 is a selected time >t1; and redefining, for a third selected time interval $t2 \leq t \leq t3$, the permitted site to include at least one of the first site and the second site, where t3 is a selected time >t2.

2. The method of claim 1, further comprising the step of redefining, for said third selected time interval, said permitted site to include only said first site.

3. The method of claim 1, further comprising the step of choosing said specified group of conditions to include the following condition: the present location of the LD unit is not within said permitted site for at least one of said interrogation times, and the arrestee has not made arrangements beforehand to leave said permitted site and to travel in a region not within said permitted site for a selected time interval.

4. The method of claim 1, further comprising the step of designating a third site, which is spaced apart from said first site and from said second site and which has a continuous closed curve of arbitrary shape as a third site boundary, as an exclusion site where said arrestee is not permitted to go.

5. The method of claim 4, further comprising the step of causing said LD unit to deliver to the arrestee's body a chemical that temporarily disables the arrestee, when said present location of said LD unit is determined to be within said exclusion site.

6. The method of claim 1, further comprising the step of redefining, for said third selected time interval, said permitted site to include only said second site.

* * * * *